Jan. 21, 1969 M. COHN 3,423,577
FULL ADDER STAGE UTILIZING DUAL-THRESHOLD LOGIC
Filed Dec. 28, 1965

INVENTOR
MARIUS COHN
BY Thomas J. Nikolai
ATTORNEY

United States Patent Office 3,423,577

Patented Jan. 21, 1969

3,423,577

FULL ADDER STAGE UTILIZING DUAL-THRESHOLD LOGIC

Marius Cohn, Minneapolis, Minn., assignor to Sperry Rand Corporation, New York, N.Y., a corporation of Delaware Filed Dec. 28, 1965, Ser. No. 516,975

U.S. Cl. 235—176 4 Claims

Int. Cl. G06f 5/04, 7/385, 7/42, 7/50

ABSTRACT OF THE DISCLOSURE

An improved full adder stage which utilizes four three-input dual-threshold logic elements in two logic levels to generate the sum and carry signals for such stages without requiring internal negation.

This invention provides an improved binary full adder stage.

Conventional prior art full adder stages utilize Boolean functions implemented with traditional Boolean elements such as disclosed by Richards on pp. 89–92 of "Arithmetical Operations in Digital Computers," D. Van Nostrand Company Inc., New York, 1955. Full adder stages of this type require a relatively large number of elements to effect and a relatively large number of logic levels to generate output signals representative of the sum and carry. Another type of full adder stage is disclosed by Cohn and Lindaman in "Axiomatic Majority-Decision Logic," IRE Trans. EC–10, pp. 17–21, March 1961, and by Curry in U.S. Patent No. 2,999,637, Sept. 12, 1961, each of which utilize majority logic functions implemented with majority logic elements. Full adder stages of this type require internal negation, thereby increasing the cost of the unit as a whole.

It has been determined that the dual-threshold logic function:

$$S_i=(B_i 1(A_i 1 C_{i-1}))$$

and $$C_i=(A_i B_i(\bar{A}_i \bar{B}_i C_{i-1}))$$

represent the sum and carry, respectively, corresponding to the *i*th digit order of an augend, A, and an addend, B. It is proposed by this invention to provide an improved full adder stage, with no internal negation, by generating signals in accordance with these dual-threshold logic functions.

The invention is effected by employing three-input dual-threshold logic elements. As used herein, the term "dual-threshold logic element" refers to a circuit having a plurality of inputs and which produces a high output when two, and only two inputs are high. There are a variety of circuits available, capable of performing the dual-threshold logic function, which are well known in the art (such as set forth by K. Menger in "A Modulo Two Adder for Three Inputs Using A Single Tunnel Diode," IRE Trans. EC–10, pp. 530–531; September 1961) and these circuits, of themselves, do not constitute a part of this invention.

The output of a three-input dual-threshold logic element having inputs X, Y, and Z can be represented as (X, Y, Z). The value of the output is "one" if and only if $X+Y+Z=2$; otherwise the output is "zero." The symbol + in the foregoing sentence indicates simple addition rather than the Boolean "OR" expression.

The sum, $S_i$, and carry, $C_i$, corresponding to the *i*th digit order of an augend of the form $A_n \ldots A_i \ldots A_1$ and an addendend of the form $B_n \ldots B_i \ldots B_1$ can be realized by generating signals in accordance with the logical functions:

$$S_i=(B_i 1(A_i 1 C_{i-1}))$$

and $$C_i=(A_i B_i(\bar{A}_i \bar{B}_i C_{i-1}))$$

where $C_{i-1}$ is the carry corresponding to the next lower digit order. These signals are generated utilizing dual-threshold logic elements. Signals representative of $S_i$ and $C_i$ can be generated in two logic levels utilizing four dual threshold logic elements with no internal negation.

Thus it is seen that by implementing the logical functions set forth above with dual-threshold logic elements, signals representative of $S_i$ and $C_i$ can be generated in a relatively short period of time utilizing a relatively small number of elements with no internal negation. The augend, A, and addend, B, are generally available in both the normal and inverted form. The novel features which are considered characteristic of this invention are set forth with particularity in the appended claims. The invention itself both as to its organization and method of operation, as well as additional advantages thereof, will be best understood from the following description when read in connection with the accompanying drawing in which:

In FIGURE 1 each of the blocks represent a three-input dual-threshold logic element.

Figure 1:
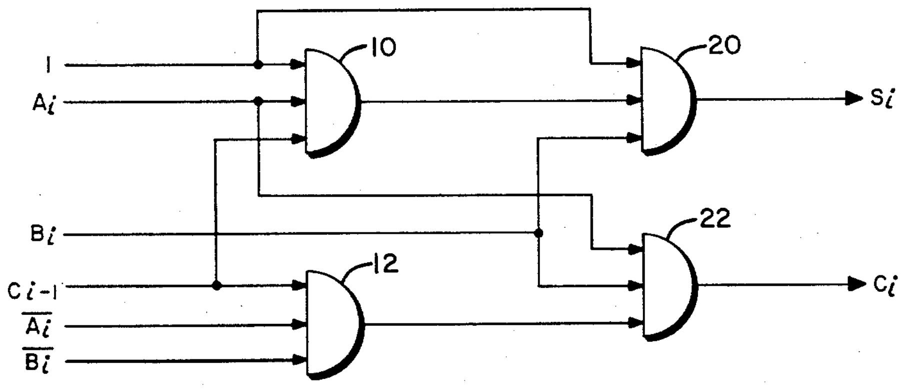
FIG. 1 is a logical block diagram of a preferred embodiment of a full adder stage designed in accordance with this invention.

With reference to FIGURE 1, a logical block diagram of a full adder stage according to the present invention is shown. The full adder stage comprises four three-input dual-threshold logic elements arranged in two levels of logic. The input terminals of dual-threshold element 10 are connected such that the element is capable of receiving three input signals representative of $A_i$, $C_{i-1}$, and a binary "one." The input terminal of dual-threshold element 12 are connected such that the element is capable of receiving three input signals representative of $\bar{A}_i$, $\bar{B}_i$ and $C_{i-1}$. Dual-threshold elements 10 and 12 each generate an output signal in the first logic level.

The output terminal of dual-threshold element 10 is connected to an input terminal of dual-threshold element 20. The remaining two input terminals of dual-threshold element 20 are connected such that the element is capable of receiving signal representations of $B_i$ and a binary "one." The output terminal of dual-threshold element 12 is connected to an input terminal of dual-threshold element 22. The remaining two input terminals of dual-threshold element 22 are connected such that the element is capable of receiving signal representations of $A_i$ and $B_i$. Duel-threshold elements 20 and 22 each generate an output signal in the second logic level.

In operation, dual-threshold element 10 receives signal representations of $A_i$, $C_{i-1}$, and a binary "one" and generates an output signal in accordance with the logical function $(A_i 1 C_{i-1})$, which is transmitted to dual-threshold element 20. Dual-threshold element 12 receives signal representations of $\bar{A}_i$, $\bar{B}_i$, and $C_{i-1}$ and generates an output signal in accordance with the logical function $(\bar{A}_i \bar{B}_i C_{i-1})$, which is transmitted to dual-threshold element 22. Dual-threshold element 20 receives signal representations of $B_i$, $(A_i 1 C_{i-1})$, and a binary "one" and generates an output signal in accordance with the logical function, $$S_i=(B_i 1(A_i 1 C_{i-1}))$$

Dual-threshold element 22 receives signal representations of $A_i$, $B_i$, and $(\bar{A}_i \bar{B}_i C_{i-1})$ and generates an output signal in accordance with the logical function, $$C_i=(A_iB_i(\overline{A}_i\overline{B}_iC_{i-1}))$$

Figure 2:
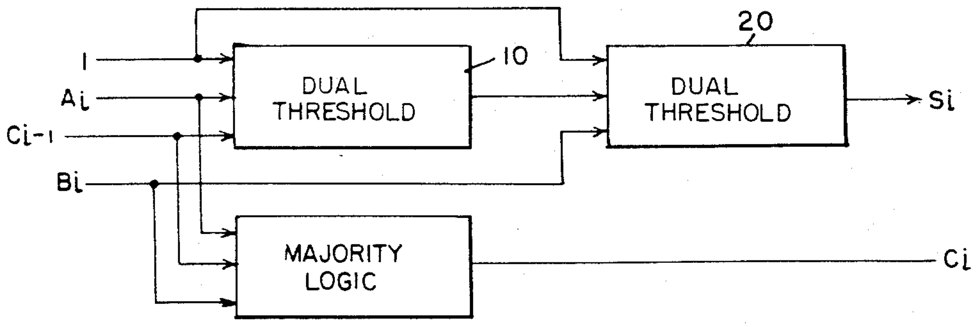
FIG. 2 is a block diagram showing the substitution of a majority logic element for two dual-threshold logic elements to produce a Carry signal.

Dual-threshold elements 12 and 22 of FIGURE 1 could be replaced by a single three-input majority logic element with input signals representative of $A_i$, $B_i$, and $C_{i-1}$ as shown in FIGURE 2. Such a majority decision element would generate a signal in accordance with the logical function $C_i=A_i\#B_i\#C_i$, as disclosed by Cohn and Lindaman, supra. The result of such a substitution would be a hybrid, majority logic-dual threshold, full adder stage with all advantages inherent in the pure dual-threshold adder stage.

It is understood that suitable modifications may be made in the structure as disclosed provided such modifications come within the spirit and scope of the appended claims. Having now, therefore, fully illustrated and described my invention, what I claim to be patentably novel and desire to protect by Letters Patent is:

1. A binary full adder stage for generating signals representative of the sum and carry corresponding to the *i*th digit order of an augend of the form $A_n \ldots A_i \ldots A_1$ and addend of the form $B_n \ldots B_i \ldots B_1$, comprising:

means for receiving signal representations of a binary "one," $A_i$, $B_i$, and $C_{i-1}$, the latter signal representation corresponding to the next lower order carry; and dual-threshold logic circuit means for utilizing said input signals to generate two signals in accordance with the logical functions, $$S_i=(B_i1(A_i1C_{i-1}))$$

and $$C_i=(A_iB_i(\overline{A}_i\overline{B}_iC_{i-1}))$$

2. A full adder stage as defined in claim 1 in which said signal representative of $C_i$ is generated in accordance with the logical function $A_i\#B_i\#C_{i-1}$ by a single majority logic element.

3. A full adder stage as defined in claim 1 in which said stage generates said output signals in two logic levels and comprises four dual-threshold logic elements.

4. A full adder stage as defined in claim 3 in which the first of said two logic levels comprises;

a first dual-threshold logic element coupled to said input means for utilizing signal representations of $A_i$, $C_{i-1}$, and a binary "one" to generate a first output signal, and a second dual-threshold logic element coupled to said input means for utilizing signal representations of $\overline{A}_i$, $\overline{B}_i$, and $C_{i-1}$ to generate a second output signal, and the second of said two logic levels comprises; a third dual-threshold logic element coupled to said input means and said first element for utilizing the output signal of said first element and signal representations of $B_i$ and a binary "one" to generate a signal representative of $S_i$, and a fourth dual-threshold logic element coupled to said input means and said second element for utilizing the output signal of said second element and signal representations of $A_i$ and $B_i$ to generate a signal representative of $C_i$.

References Cited

UNITED STATES PATENTS

| | | | |
|---|---|---|---|
| 3,113,206 | 12/1963 | Harel | 235—176 |
| 3,156,816 | 11/1964 | Kosonocky et al. | 235—172 |
| 3,275,813 | 9/1966 | Brastins | 235—176 |
| 3,296,424 | 1/1967 | Cohn | 235—152 |
| 3,348,033 | 10/1967 | Gruodis et al. | 235—175 |

OTHER REFERENCES

W. E. Barnette and H. S. Miller, Tunnel Diode Adder, RCA Technical Notes, March 1964, RCA TN No. 568.

MALCOLM A. MORRISON, *Primary Examiner.*

D. H. MALZAHN, *Assistant Examiner.*

U.S. Cl. X.R.

235—172